United States Patent [19]

Goble

[11] 4,360,135

[45] Nov. 23, 1982

[54] LUGGAGE CARRIER

[75] Inventor: Charles M. Goble, London, Canada

[73] Assignee: Trim-Gard Company Ltd., London, Canada

[21] Appl. No.: 313,743

[22] Filed: Oct. 22, 1981

[30] Foreign Application Priority Data

May 5, 1981 [CA] Canada .................................. 387324

[51] Int. Cl.$^3$ .............................................. B60R 9/06
[52] U.S. Cl. .......................... 224/42.08; 224/42.03 R; 293/118
[58] Field of Search ..................... 224/42.08, 42.03 R, 224/42.32, 42.44; 293/114, 118

[56] References Cited

U.S. PATENT DOCUMENTS

| | | | |
|---|---|---|---|
| 1,506,274 | 8/1924 | Specht | 224/42.03 R |
| 1,838,500 | 12/1931 | Russell et al. | 224/42.08 |
| 1,977,734 | 10/1934 | Monckmeier | 224/42.08 |
| 2,206,444 | 7/1940 | Beckwith | 224/42.08 |
| 2,593,908 | 4/1952 | Montverde | 224/42.08 |
| 4,125,214 | 11/1978 | Penn | 224/42.08 |

FOREIGN PATENT DOCUMENTS 557139  8/1923  France .............................. 224/42.08

Primary Examiner—Steven M. Pollard
Attorney, Agent, or Firm—Fetherstonhaugh & Co.

[57] ABSTRACT

This invention relates to a luggage carrier for an automobile which has a rear bumper projecting rearwardly therefrom which comprises a pair of support brackets adapted to be mounted on said bumper; and a platform pivotably mounted on said brackets for movement between an upright storage configuration and a horizontal load support configuration, said platform having a first pair of transverse supports extending transversely thereof one on either side of the center of the length of the platform and at least one detachable longitudinal rail extending longitudinally between and detachably connected to said first pair of transverse supports so as to be removable to provide a viewing aperture in said platform proportioned to expose the licence plates of the automobile to view when the platform is in the upright configuration.

6 Claims, 5 Drawing Figures

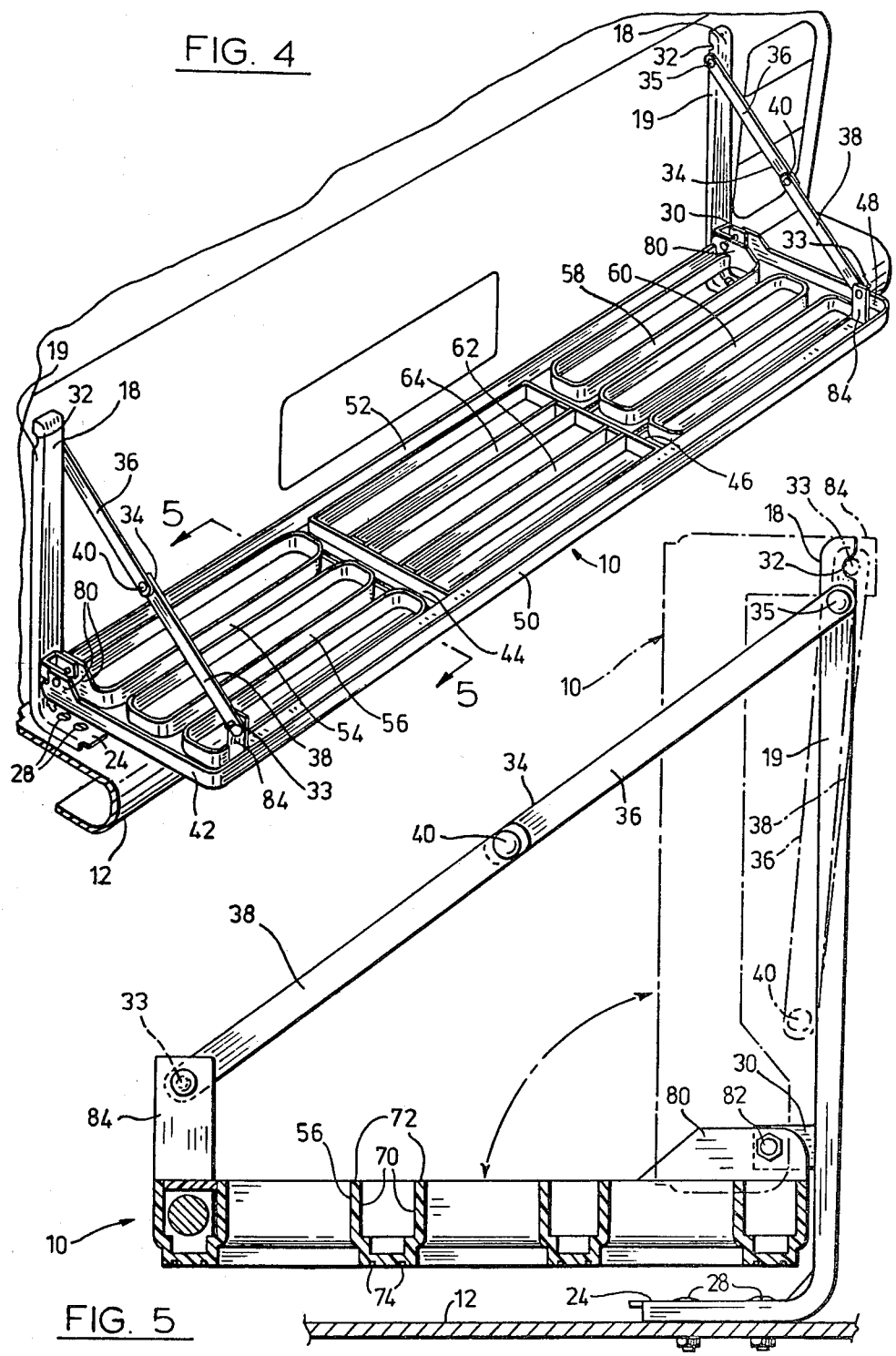

LUGGAGE CARRIER

This invention relates to luggage carriers for automobiles.

In particular, this invention relates to a luggage carrier designed to be mounted at the rear of an automobile.

PRIOR ART

As a result of the trend toward smaller automobiles, the luggage storage capacity of the average automobile has been substantially reduced. This problem can be overcome by employing external luggage racks. Roof racks are the most common form of luggage racks presently in use. However, these have the disadvantage of being relatively inaccessible.

Many years ago, it was the practice to provide a luggage rack at the rear of an automobile. Such luggage racks were generally installed by the manufacturer with provision being made for the mounting of the licence plates in a position so as to be accessible when the platform was in use.

Automobiles are currently manufactured with provision being made for the location of the licence plate at a fixed position at the rear of the vehicle. If a conventional rear-mounted luggage carrier is mounted at the rear of a modern automobile, it will obscure the license plate when in the storage position.

I have found that I can overcome the problems associated with obscuring the licence plate when a luggage carrier is in its storage position by forming the carrier so that at least one of its longitudinal support rails can be detached to provide a viewing aperture extending through the platform to expose the licence plate of the automobile.

Previous rear-mounted luggage carriers were mounted directly to the body of the automobile. Modern automobile construction is such that this cannot be effected to-day and, in order to overcome this difficulty, I find it necessary to mount the luggage carrier directly onto the rear bumper by providing support brackets which are adapted to be mounted directly on the bumper. To achieve this objective, the support brackets are formed with a foot portion which projects to underlie the platform and to overlie the bumper.

SUMMARY OF INVENTION

According to one aspect of the present invention, a luggage carrier for an automobile which has a rear bumper projecting rearwardly therefrom comprises a pair of support brackets adapted to be mounted on said bumper, a platform pivotably mounted on said brackets for movement between an upright storage configuration and a horizontal load support configuration, said platform having a first pair of transverse supports extending transversely thereof one on either side of the centre of the length of the platform and at least one detachable longitudinal rail extending longitudinally between and detachably connected to said first pair of transverse supports so as to be removable to provide a viewing aperture in said platform proportioned to expose the licence plates of the automobile to view when the platform is in the upright configuration.

According to a further aspect of the present invention, there is provided a luggage carrier for an automobile which has a rear bumper projecting rearwardly therefrom which comprises a pair of L-shaped support brackets each of which includes an upright support column in a generally horizontal foot portion, a platform is pivotably mounted on the upright support column and the foot portion of the support column projects to underlie the platform and is adapted for securement to the bumper pad.

The invention will be more clearly understood with reference to the following detailed specification read in conjunction with the drawings wherein:

FIG. 4 is a pictorial view of the luggage rack in the lowered position; and

FIG. 5 is a sectional view along the line 5—5 of FIG. 4;

Figure 1:
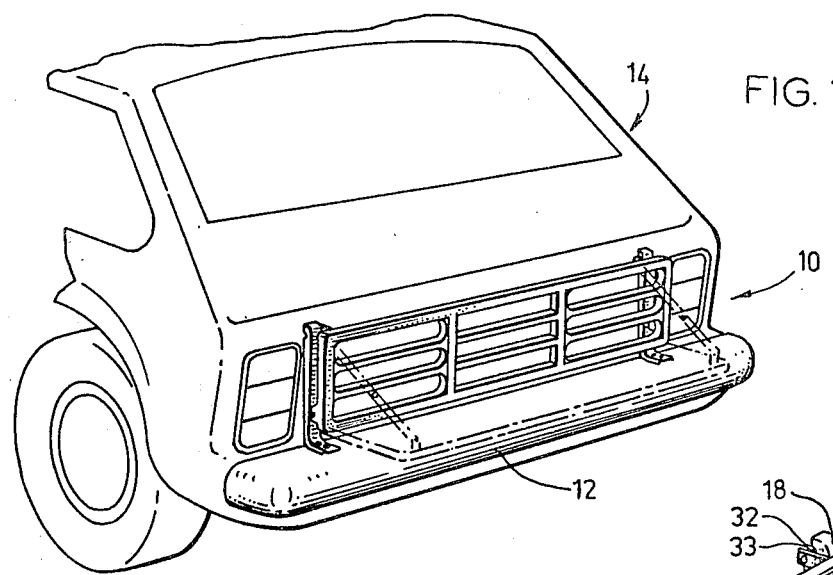
FIG. 1 is a pictorial view of the rear of an automobile illustrating the manner in which a luggage carrier of the present invention is mounted thereon.

With reference to FIG. 1 of the drawings, reference numeral 10 refers generally to a luggage carrier rack which is mounted on the rear bumper 12 of an automobile 14.

Figure 2:
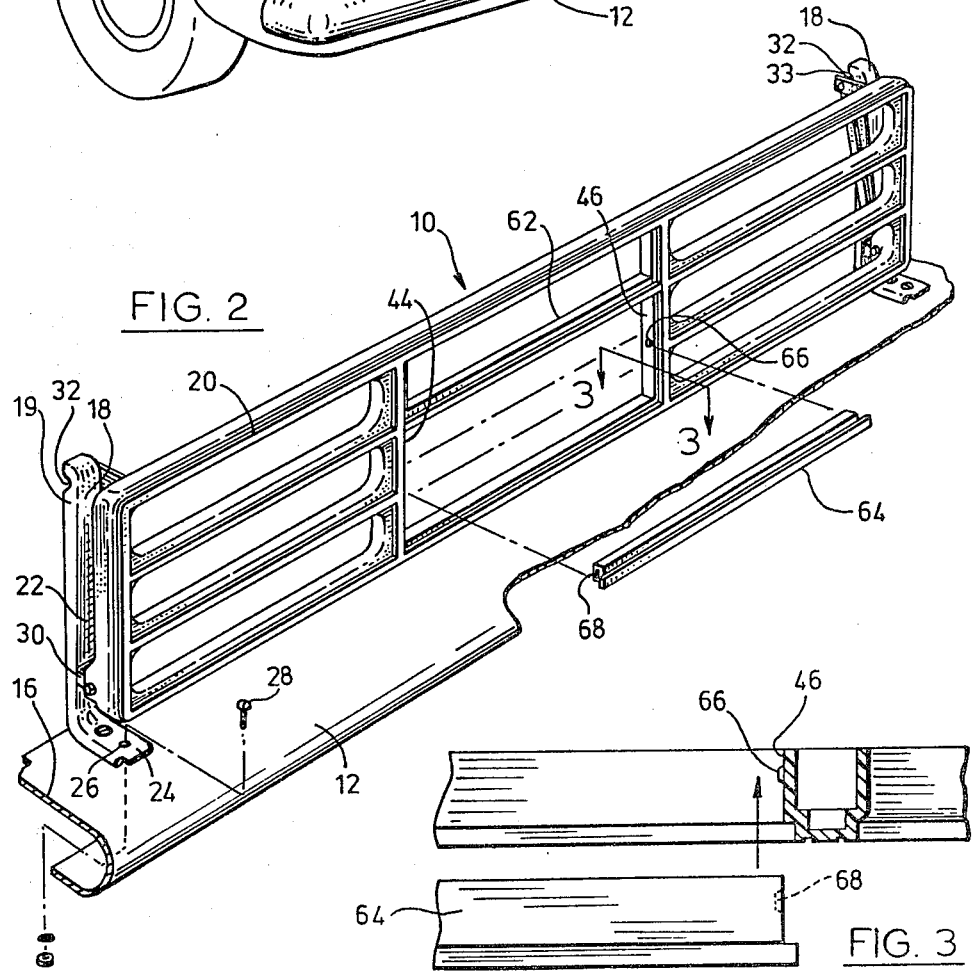
FIG. 2 is an enlarged pictorial rear view of the luggage rack of FIG. 1.

As shown in FIG. 2 of the drawings, the rear bumper 12 is a U-shaped cross-section which includes an upper wall 16.

The luggage carrier 10 comprises a pair of support brackets 18 and a platform 20.

The support brackets 18 are L-shaped and include an upright support column 22 and a foot portion 24. Each support bracket 18 has a U-shaped cross-section and side wall portions 19. The foot portion 24 is formed with passages 26 through which mounting bolts 28 may extend to secure the support columns directly to the upper wall 16 of the bumper. Each support bracket 18 has a mounting bracket 30 at the lower end of the support column 22. A notch 32 is formed in the sidewalls 19 at the upper end of each support column 22. An articulating brace 34 which consists of an upper arm 36 and a lower arm 38 has the free end of its upper arm 36 hingedly connected to the upper end of the support column 22 by a pivot pin 35 and the free end of the arm 38 is pivotally connected to the platform 20 by means of a pin 33. The pin 33 projects beyond the arm 38 and serves as a locking pin which enters notch 32 of its associated column 22 to retain the platform 20 in a raised position in use. There is a sufficient freedom of movement between the platform and the support column to ensure that locking and release of the pins 33 and notches 32 can be achieved without requiring that the pins 33 be retractable. The arms 36 and 38 are pivotally connected to one another by means of a pivot pin 40.

Figure 3:
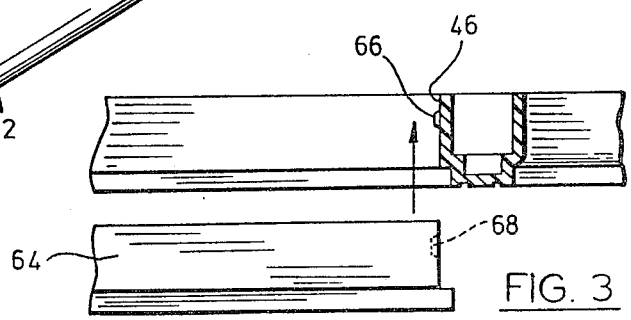
FIG. 3 is a sectional view along the line 3—3 of FIG. 2.

The platform 20 has four transversely extending support rails 42, 44, 46 and 48 and six longitudinally extending support rails 50, 52, 54 and, 56, 58 and 60. The support rails 42, 44, 46, 48, 50, 52, 54, 56, 58 and 60 are integrally formed as a unitary injection moulded plastic body. A pair of detachable longitudinal rails 62 and 64 extend longitudinally between and are detachably connected to the transverse rails 44 and 46. Detents 66 are formed on the side faces of the transverse rails 46 and 48 which releasably engage complementary recesses 68 formed in opposite ends of the detachable longitudinal rails 62 and 64 (FIG. 3).

The cross-sectional configuration of each of the rails of the support platform is substantially the same and will be described with reference to the cross-section of the rail 56 illustrated in FIG. 5 of the drawings. The rail 56 has a pair of oppositely disposed sidewalls 70 the upper edges 72 of which form the support surface for the luggage. The sidewalls 70 are connected by a U-shaped bridge portion 72 on the outer face of which a pair of narrow U-shaped channels 74 are formed for decorative purposes.

The rails 42 and 48 each have lugs 80 at the inner end thereof which are pivotally connected to the lug 30 by means of a pivot pin 82. Similarly, lugs 84 are formed integrally with the rail 50 and are pivotally connected to arms 38 by means of pivot pins 86.

Preferably, the L-shaped support brackets 18 are made from a substantially rigid metal and the brace arms 36 and 38 are made from a substantially rigid metal.

A suitable plastic material for use in the manufacture of the platform is A. B. S.

To mount the luggage carrier of the present invention, it is merely necessary to position the assembled carrier on a bumper as shown in FIGS. 1 and 2 to permit the passages 26 of the foot portion to act as a template for the purposes of forming the mounting passages in the bumper. When the mounting passages are formed in the bumper, the foot portion 26 is secured by means of mounting bolts 28 such that the platform 20 may articulate between the upright storage position shown in FIGS. 1 and 2 of the drawings and the lowered luggage supporting position shown in FIGS. 4 and 5 of the drawings. If the licence plate of the automobile is obscured when the luggage rack is in the upright position shown in FIG. 1 of the drawings, one or other or both of the detachable rails 62 and 64 may be removed to provide a viewing aperture.

I have found that by constructing the platform such that the frame of the platform has three rows of rectangular-shaped apertures extending parallel to one another along the longitudinal extent of the platform and wherein each row consists of three apertures which are longitudinally aligned with one another, it is possible to provide a luggage carrier which has sufficient rigidity to support luggage when one or other or both of the detachable rails 52 are removed.

From the foregoing, it will be apparent that the luggage carrier of the present invention is rarely adaptable for mounting at the rear of an automobile.

It will be understood that in jurisdictions in which it is essential to display a rear licence plate at all times when a vehicle is in use, it may be necessary to provide an additional licence plate mounting so that the licence plate may be viewed when the luggage rack is loaded with luggage.

What I claim as my invention is:

1. A luggage carrier for an automobile which has a rear bumper projecting rearwardly therefrom comprising;
   (a) a pair of support brackets adapted to be mounted on said bumper; and
   (b) a platform pivotably mounted on said brackets for movement between an upright storage configuration and a horizontal load support configuration, said platform having a first pair of transverse supports extending transversely thereof one on either side of the centre of the length of the platform and at least one detachable longitudinal rail extending longitudinally between and detachably connected to said first pair of transverse supports so as to be removable to provide a viewing aperture in said platform proportioned to expose the licence plates of the automobile to view when the platform is in the upright configuration.

2. A luggage carrier as claimed in claim 1 wherein said platform has two detachable longitudinally extending rails extending longitudinally between said first pair of transverse supports, said two detachable rails being transversely spaced and independently detachable to permit selective detachment to provide said viewing apertures at one of two transversely spaced locations.

3. A luggage carrier as claimed in claim 1 wherein said support brackets are L-shaped and include an upright support column and a generally horizontal foot portion, said platform being pivotably mounted on said upright column and foot portion projecting from the column to underlie the platform, passage means in said foot portion through which it may be secured directly to said bumper.

4. A luggage carrier as claimed in claim 1 wherein said platform is an injection moulded plastic member.

5. A luggage carrier as claimed in claim 1 wherein said platform comprises an injection moulded plastic frame having a plurality of longitudinally extending support rails arranged in spaced relationship in a grid pattern, each of said support rails having a U-shaped cross-sectional configuration which opens upwardly when said platform is located in said horizontal configuration.

6. A luggage carrier as claimed in claim 1 wherein said platform comprises an injection moulded plastic frame having three rows of rectangular-shaped apertures extending parallel to one another along the longitudinal extent of the platform, each of said rows consisting of three apertures which are longitudinally aligned with one another, each of said apertures having a stiffening skirt projecting upwardly about the periphery thereof and a stiffening skirt projecting upwardly about the periphery of the frame when the platform is in the horizontal position.

* * * * *